(12) United States Patent
Amend

(10) Patent No.: US 11,767,828 B2
(45) Date of Patent: Sep. 26, 2023

(54) LIGHT TURBINE, TURBINE, AND TURBINE HOUSING FOR VANE EVALUATION

(71) Applicant: Daniel L. Amend, Saugerties, NY (US)

(72) Inventor: Daniel L. Amend, Saugerties, NY (US)

(*) Notice: Subject to any disclaimer, the term of this patent is extended or adjusted under 35 U.S.C. 154(b) by 0 days.

(21) Appl. No.: 18/126,668

(22) Filed: Mar. 27, 2023

(65) Prior Publication Data
US 2023/0250809 A1 Aug. 10, 2023

(51) Int. Cl.
*F03G 7/00* (2006.01)
*F03G 6/00* (2006.01)

(52) U.S. Cl.
CPC ............. *F03G 7/016* (2021.08); *F03G 6/00* (2013.01)

(58) Field of Classification Search
CPC . F03G 7/016; F03G 7/00; F03G 7/005; F03G 6/00; F03G 6/001; F03G 6/04; F03G 6/045; F03G 6/06; F03B 7/00; F03B 7/003; F03B 7/006; F03B 17/062; H02S 99/00
See application file for complete search history.

(56) References Cited

U.S. PATENT DOCUMENTS

| | | |
|---|---|---|
| 182,172 A | 9/1876 | Crookes |
| 1,000,831 A | 8/1911 | Martin |
| 1,343,577 A | 6/1920 | Okey |
| 3,031,852 A | 5/1962 | White |
| 3,048,006 A | 8/1962 | Goodman |
| 3,067,572 A | 12/1962 | Baumgartner |
| 3,137,125 A | 6/1964 | Kyryluk |
| 3,985,118 A | 10/1976 | Bard |
| 4,353,003 A * | 10/1982 | Sommers ............... F03G 7/016 310/306 |
| 4,397,150 A | 8/1983 | Paller |
| 4,410,805 A | 10/1983 | Berley |

(Continued)

FOREIGN PATENT DOCUMENTS

| | | |
|---|---|---|
| CN | 2400591 Y | 3/1999 |
| CN | 1563712 A | 1/2005 |

(Continued)

OTHER PUBLICATIONS

Crookes radiometer, printed from https://en.wikipedia.org/wiki/Crookes_radiometer on Apr. 7, 2022, 8 pages.

(Continued)

*Primary Examiner* — Mark A Laurenzi
*Assistant Examiner* — Xiaoting Hu
(74) *Attorney, Agent, or Firm* — LaBatt, LLC

(57) ABSTRACT

A light turbine, turbine, and turbine housing are described, in which the turbine housing can include a main housing and a chimney. The main housing and chimney define a circular path within which vanes located on the ends of spokes can move. Movement of the vanes can cause rotation of a shaft attached to the spokes. The chimney can be removably attached to the main housing to allow access to the vanes, which can be removably attached to the spokes. The turbine housing and turbine can be configured such that various compositions and/or configurations of vanes can be evaluated in conjunction with one or more forms of energy sources, such as an electromagnetic radiation source. The turbine housing can enable selective evaluation within ambient air, a partial vacuum, and/or the like.

20 Claims, 9 Drawing Sheets

(56) References Cited

U.S. PATENT DOCUMENTS

| | | |
|---|---|---|
| 4,452,047 A | 6/1984 | Hunt et al. |
| 4,741,154 A | 5/1988 | Eidelman |
| 4,926,037 A | 5/1990 | Martin-Lopez |
| 4,939,976 A | 7/1990 | Minovitch |
| 5,300,817 A | 4/1994 | Baird |
| 5,542,247 A | 8/1996 | Bushman |
| 6,282,894 B1 | 9/2001 | Smith |
| 6,488,233 B1 | 12/2002 | Myrabo |
| 6,710,281 B1 | 3/2004 | Wachnuk |
| 7,821,151 B2 | 10/2010 | Le et al. |
| 8,596,572 B1 | 12/2013 | Kirshman et al. |
| 9,705,383 B1 | 7/2017 | Larraza et al. |
| 9,728,699 B2 | 8/2017 | Zonenberg et al. |
| 9,822,786 B1 | 11/2017 | Larraza et al. |
| 10,352,271 B1 | 7/2019 | Yavid et al. |
| 2004/0144092 A1 | 7/2004 | Jarman |
| 2004/0256539 A1 | 12/2004 | Clay |
| 2006/0000215 A1 | 1/2006 | Kremen et al. |
| 2006/0001569 A1 | 1/2006 | Scanurra |
| 2008/0296899 A1* | 12/2008 | Janca ............... F03B 17/062 290/54 |
| 2011/0240622 A1 | 10/2011 | Sanchez et al. |
| 2012/0204564 A1 | 8/2012 | Battaglia |
| 2015/0013337 A1 | 1/2015 | Nutter et al. |
| 2016/0141987 A1* | 5/2016 | Bergman ............ F03B 13/00 290/43 |
| 2018/0298884 A1 | 10/2018 | Nutter |
| 2021/0207573 A1* | 7/2021 | Gehring ............ F03B 13/00 290/43 |

FOREIGN PATENT DOCUMENTS

| | | | | |
|---|---|---|---|---|
| CN | 201138530 Y | | 10/2008 | |
| CN | 102230456 A | | 11/2011 | |
| CN | 203384420 U | * | 1/2014 | |
| CN | 204117447 U | | 1/2015 | |
| CN | 105197258 A | | 12/2015 | |
| CN | 107401489 A | | 11/2017 | |
| DE | 102008018998 A1 | * | 10/2009 | ............ F03B 13/06 |
| GB | 1395137 A | * | 5/1975 | ............ H01S 3/0007 |
| GB | 1395137 A | | 5/1975 | |
| GB | 2180411 A | | 3/1987 | |
| KR | 20100135579 A | * | 12/2010 | |
| KR | 20160042601 A | * | 4/2016 | ............ F03B 13/06 |
| WO | 1999044841 A | | 9/1999 | |
| WO | WO-2022053467 A1 | * | 3/2022 | |

OTHER PUBLICATIONS

Laser propulsion, printed from https://en.wikipedia.org/wiki/Laser_propulsion on Apr. 7, 2022, 7 pages.

Lightcraft, printed from https://en.wikipedia.org/wiki/Lightcraft on Apr. 7, 2022, 5 pages.

Davis et al., Review of Laser Lightcraft Propulsion System (Preprint), 5th International Symposium on Beamed Energy Propulsion, Nov. 12-15, 2007, 14 pages.

Han et al., Light-Powered Micromotor: Design, Fabrication, and Mathematical Modeling, Journal of Micromechanical Systems, vol. 20, No. 2. Apr. 2011, pp. 487-496.

Zhang et al., Macroscopic and Direct Light Propulsion of Bulk Graphene Material, file saved on Apr. 7, 2022, 22 pages.

* cited by examiner

LIGHT TURBINE, TURBINE, AND TURBINE HOUSING FOR VANE EVALUATION

TECHNICAL FIELD

The disclosure relates generally to evaluating vanes for converting an energy source into mechanical energy, and more particularly, to a housing configured for evaluating various vane compositions and/or configurations for their ability to generate mechanical energy from another energy source, such as electromagnetic radiation.

BACKGROUND ART

Various energy sources have been used to generate rotational movement within machines, such as turbines and engines. Many such sources rely on fossil fuels. Considering the finite resources available and the negative environmental impact of fossil fuels, the need to transition away from and/or supplement the use of fossil fuels is of significant importance.

For many years, there has been a considerable amount of research and development toward the use of light energy to move objects. Variations of systems, apparatuses, and methods include but are not limited to the Crookes Radiometer, which is a partially evacuated glass chamber containing a set of vanes mounted on a spindle that rotate when exposed to light, and the Laser Lightcraft Propulsion System, which uses a laser to heat ambient air near an object until the air explodes, propelling the object forward. These systems are based on various technologies including thermal transpiration, laser propulsion, induced electron emissions, photon radiation pressure, and others. Much of the focus of these systems has been on generating electricity and propulsion for space travel.

Although advancements have been made, limitations still exist and more work is necessary to improve the conversion of light energy into viable mechanical energy.

SUMMARY OF THE INVENTION

The inventor recognizes a need for an improved solution for evaluating approaches for creating mechanical energy from other energy sources, such as light energy. Embodiments of the invention described herein can be utilized to stimulate imagination and inspire creativity toward further development of alternative turbine and engine designs directed to such solutions. The alternative designs can be used to create solutions that perform useful work while generating fewer to no carbon emissions, thereby supplementing and/or enabling a transition away from the use of fossil fuels.

Aspects of the invention provide a light turbine, turbine, and turbine housing, in which the turbine housing can include a main housing and a chimney. The main housing and chimney define a circular path within which vanes located on the ends of spokes can move. Movement of the vanes can cause rotation of a shaft attached to the spokes. The chimney can be removably attached to the main housing to allow access to the vanes, which can be removably attached to the spokes. The turbine housing and turbine can be configured such that various compositions and/or configurations of vanes can be evaluated in conjunction with one or more forms of energy sources, such as an electromagnetic radiation source. The turbine housing can enable selective evaluation within ambient air, a partial vacuum, and/or the like.

An embodiment of the turbine system, apparatus and method described herein establishes a platform to test and harness forces exerted by lasers and other concentrated light sources on various vane compositions and configurations. It can apply a number of scientific technologies, which cause rotation of an axis shaft within ambient air and/or a partial vacuum.

Embodiments can incorporate an assembly design using one or more transition fits (e.g., also referred to as a push fit or a snug fit), which can enable easier disassembly, interchange of vanes, and reassembly. Such embodiments can facilitate further experimentation, enhancement, and development, while seeking the most efficient light energy conversion to mechanical energy.

A first aspect of the invention provides a light turbine comprising: a turbine housing including: a main housing; a chimney, removably attached to the main housing, wherein the main housing and chimney define a circular path within which vanes can move; a shaft extending through the main housing; and a hub configured to secure a plurality of spokes, wherein each spoke extends radially from the hub and removably supports a corresponding vane located within the circular path; and an electromagnetic radiation source configured to direct electromagnetic radiation into the chimney for causing the vanes to move in and through the chimney thereby causing rotation of the shaft.

A second aspect of the invention provides a turbine comprising: a turbine housing including: a main housing; and a chimney, removably attached to the main housing using a transition fit between a set of openings and protrusions, wherein the main housing and chimney define a circular path within which vanes can move; and an energy source configured to direct a source of energy into the chimney for causing the vanes to move in and through the chimney.

A third aspect of the invention provides a turbine housing comprising: a main housing; and a chimney, removably attached to the main housing, wherein the main housing and chimney define a circular path within which vanes can move, wherein the chimney is oriented substantially vertically when attached to the main housing and an interior surface of the chimney is reflective.

The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a light turbine, turbine, and turbine housing, in which the turbine housing can include a main housing and a chimney. The main housing and chimney define a circular path within which vanes located on the ends of spokes can move. Movement of the vanes can cause rotation of a shaft attached to the spokes. The chimney can be removably attached to the main housing to allow access to the vanes, which can be removably attached to the spokes. The turbine housing and turbine can be configured such that various compositions and/or configurations of vanes can be evaluated in conjunction with one or more forms of energy sources, such as an electromagnetic radiation (e.g., light energy) source. The turbine housing can enable selective evaluation within ambient air, a partial vacuum, and/or the like.

As used herein, the term "electromagnetic radiation" includes electromagnetic radiation of a type, including radio waves, microwaves, infrared light, visible light, ultraviolet light, x-rays, and gamma rays. As also used herein, the term "light," when used in reference to electromagnetic radiation, is inclusive of all types of electromagnetic radiation unless otherwise stated.

Turning to the drawings, FIGS. 1A-1F show perspective, front, right, left, top, and bottom views, respectively, of an illustrative turbine housing 100 according to an embodiment of the invention. FIG. 2 shows an exploded view of the various components of the turbine housing 100 according to an embodiment.

Figure 1A:
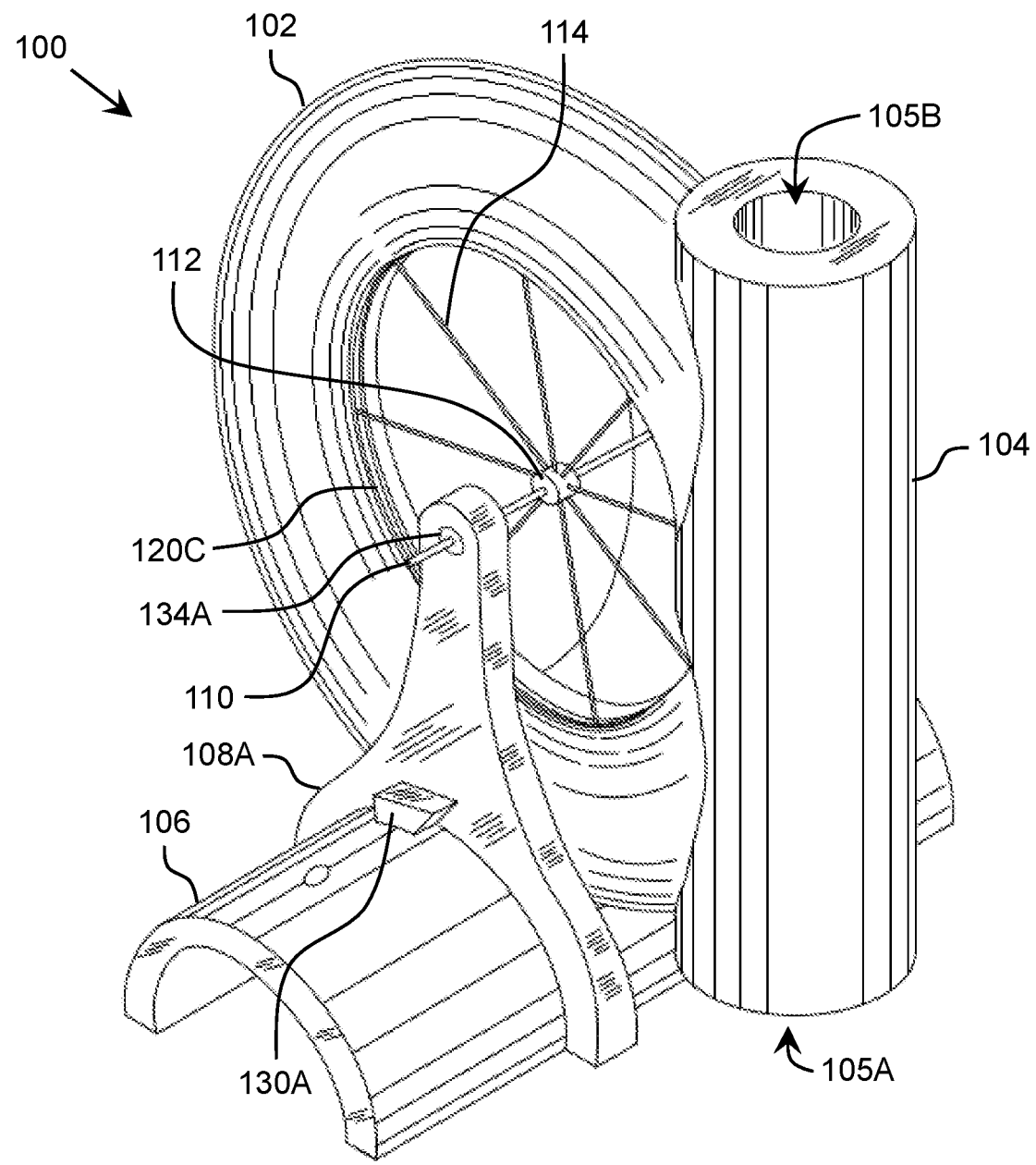
FIGS. 1A-1F show perspective, front, right, left, top, and bottom views, respectively, of an illustrative turbine housing according to an embodiment of the invention.
Figure 1B:
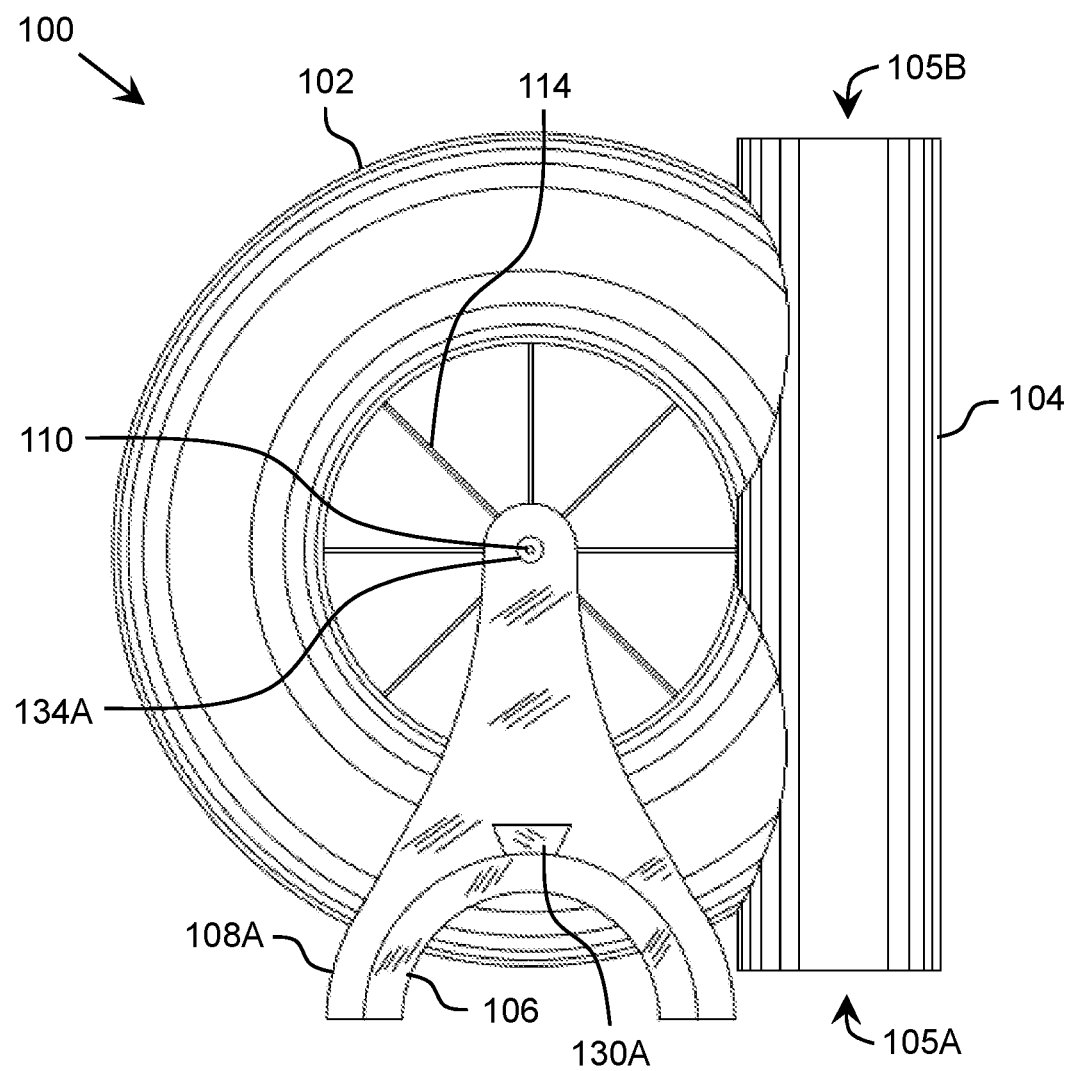
Figure 1C:
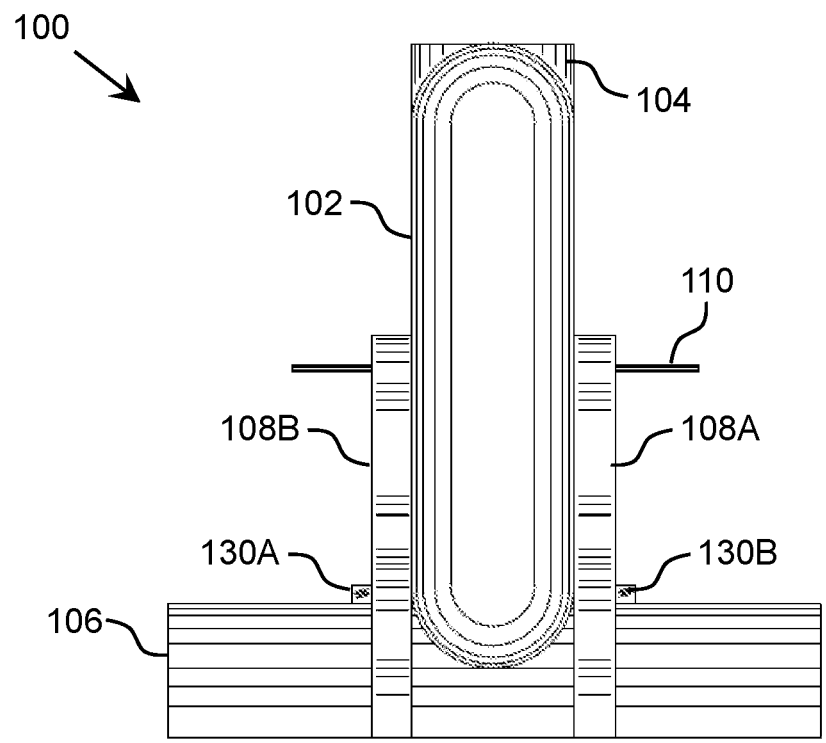
Figure 1D:
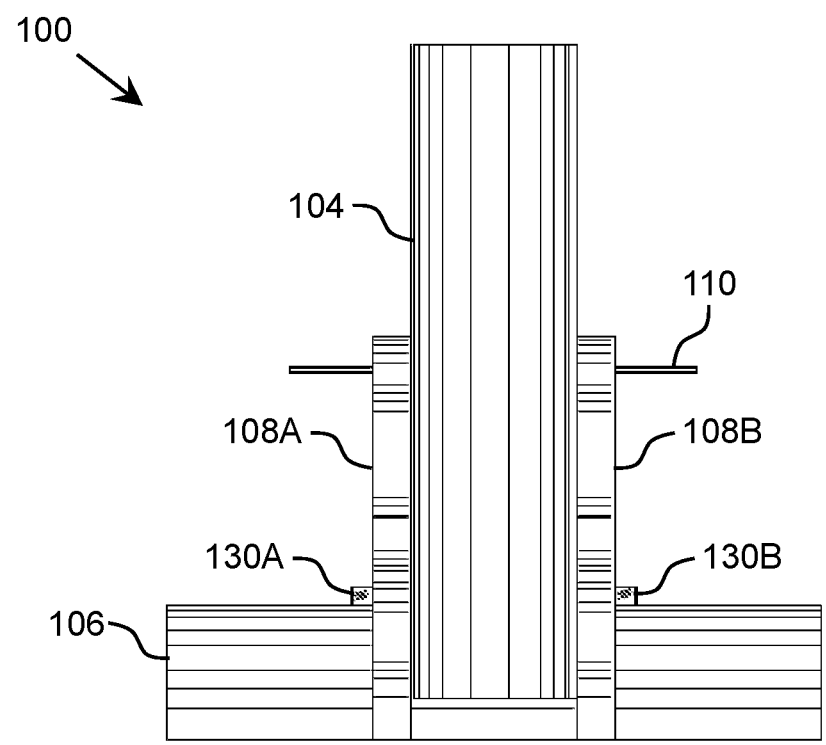
Figure 1E:
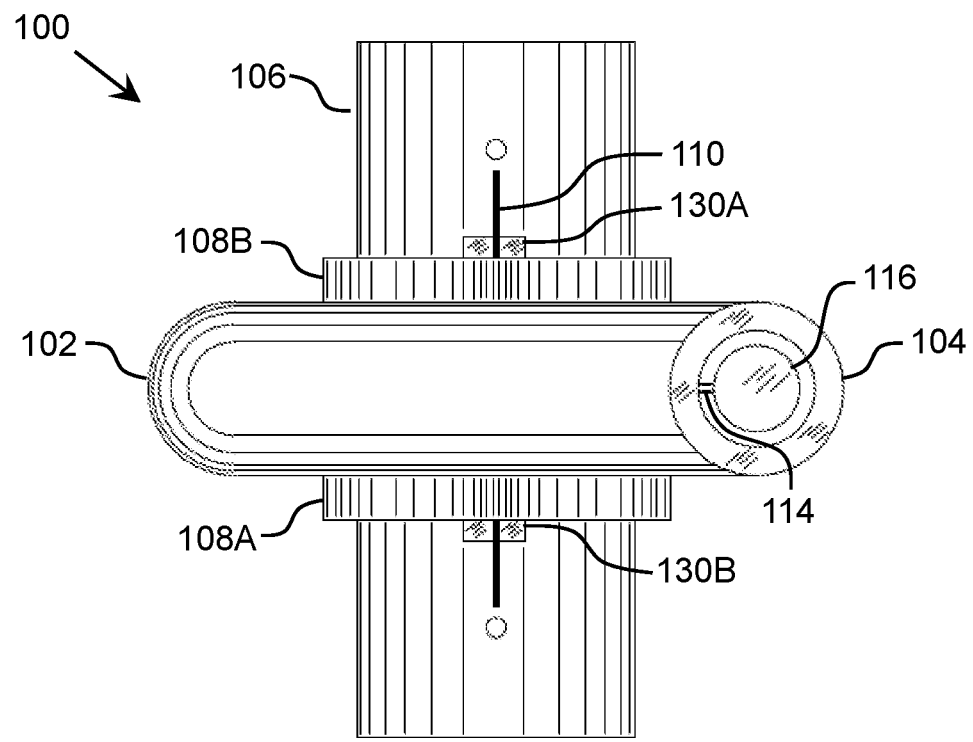
Figure 1F:
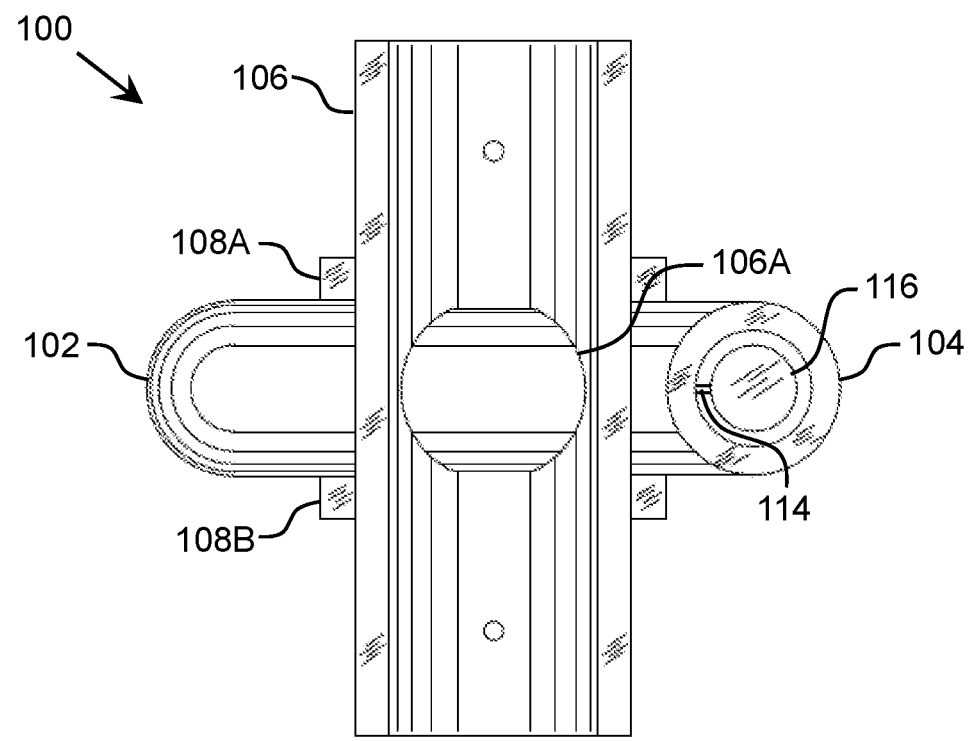
Figure 2:
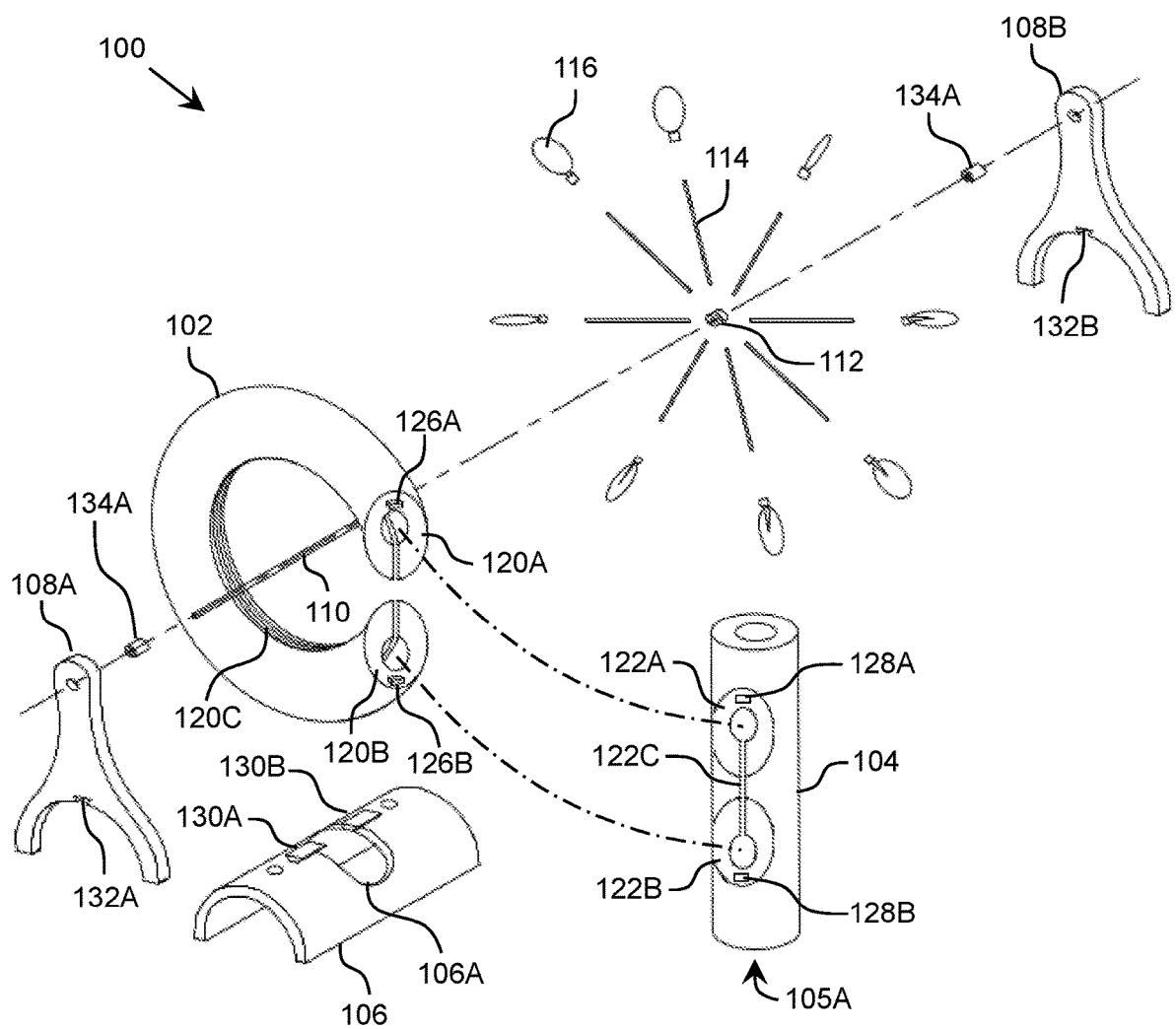
FIG. 2 shows an exploded view of the various components of the turbine housing according to an embodiment.

Referring to FIGS. 1A-2, the turbine housing 100 includes a main housing 102, a chimney 104, a base 106, and a pair of shaft mounts 108A, 108B. The shaft mounts 108A, 108B are configured to rotatably support a shaft 110 with a hub 112 and a plurality of spokes 114 extending radially from the hub 112. Each spoke 114 includes a corresponding vane 116 attached to an end thereof.

During operation within a turbine system, an energy source, such as an electromagnetic radiation source (e.g., visible light), is directed into a first end, such as a bottom 105A, of the chimney 104. The energy source travels through the chimney 104, contacting one or more vanes 116, which are mounted to an end of each of the spokes 114, and are located within the chimney 104. The vanes 116 are configured to convert the energy source into mechanical energy by converting the energy imparted on the vane 116 into rotational energy for the corresponding spoke 114. The rotational energy can cause the spoke 114 to rotate, thereby causing the hub 112 and shaft 110 also to rotate. The rotation will cause vanes 116 to rotate through the chimney 104 and the main housing 102. Within the main housing 102, substantially no energy is directed onto the vanes 116. As a result, the chimney 104 of the turbine housing 100 provides a defined area within which vanes 116 are subjected to the energy source.

The main housing 102 is sized and configured to provide an area that enables the unobstructed rotation of the spokes 114 and vanes 116. In an embodiment, the main housing 102 is an arc-shaped structure. The main housing 102 can be fabricated using any suitable material. For example, an embodiment of the main housing 102 can be formed of a heat resistant material. In an embodiment, some or all of the main housing 102 can be formed of a transparent or translucent material, which can enable movement of the vanes 116 to be viewed from outside of the main housing 102. In a more particular embodiment, the material can be fused quartz, high silica glass, ceramic, a carbon fiber composite, a nickel based alloy, and/or the like. Alternatively, the main housing 102 can be at least partially fabricated from an opaque material, such as a ceramic, a carbon fiber composite, a nickel based alloy, etc. As illustrated, the main housing 102 can have a shape of a circular tube with an open center area. However, it is understood that embodiments of the main housing 102 can form a substantially enclosed structure. Such a structure, when used in conjunction with a suitably configured chimney 104, can provide an enclosed area within which one or more environmental aspects can be controlled, such as a humidity, a temperature, a pressure (e.g., partial or complete vacuum), a gas, etc.

The chimney 104 can have a generally cylindrical shape with an open bottom 105A and top 105B. In an embodiment, the chimney 104 is generally straight. The chimney 104 can be fabricated using any suitable material. For example, an embodiment of the chimney 104 can be formed of a heat resistant material. In an embodiment, the chimney 104 can be formed of an opaque material. Illustrative materials for the chimney 104 include a ceramic, a carbon fiber composite, a nickel based alloy, etc. In a more particular embodiment, at least an interior surface of the chimney 104 can be formed of a reflective material, such as polished silver, a polished aluminum alloy, etc. While the main housing 102 and chimney 104 are each illustrated as a unitary structure, it is understood that the main housing 102 and/or chimney 104 can be fabricated from two or more parts, which are subsequently permanently or removably assembled to form the main housing 102 and/or chimney 104. To this extent, illustrative fabrication techniques include shaping, cutting, and/or molding a material, injection molding, three-dimensional printing, etc. When fabricated from multiple parts, the parts can be assembled using a transition fit, an interference fit, an adhesive, welding, etc.

The chimney 104 can define an internal channel that is sized to accommodate the unobstructed rotation of the ends of spokes 114 and the corresponding vanes 116 therein. In an embodiment, the internal channel of the chimney 104 has substantially the same dimensions (e.g., diameter) as an arc-shaped channel formed in the interior of the main housing 102. In this manner, the main housing 102 and chimney 104 can form a hollow, substantially circular path through which the spokes 114 and vanes 116 can travel without obstruction. In a further embodiment, the chimney 104 and the main housing 102 have internal and external diameters that are substantially the same size. However, it is understood that other configurations can be implemented.

The main housing 102 includes two ends 120A, 120B, each of which is configured to attach to a corresponding opening 122A, 122B on the chimney 104. To this extent, each main housing end 120A, 120B can have a size, orientation, etc., so as to enable a releasable connection between the main housing end 120A, 120B and the corresponding chimney opening 122A, 122B. In an embodiment, when properly connected, the connection between the main housing end 120A, 12B and the corresponding chimney opening 122A, 1226 is airtight in the outer portions of the corresponding connection. In this case, only an open channel 120C located along an inner circumference of the main housing 102 and an open channel 122C located on the chimney 104 between the two openings 122A, 122B and aligned with the channel 120C of the main housing 102, which are sized and configured to enable the unobstructed motion of the spokes 114 therethrough, will include an opening that allows ambient air and/or other gases to pass into the channels of the main housing 102 and the chimney 104 traversed by the vanes 116.

The chimney 104 can have any suitable length. For example, as illustrated, the chimney 104 has an overall length that is approximately the same as the outer diameter of the main housing 102. The openings 122A, 122B of the chimney 104 can be located such that the bottom 105A and top 105B of the chimney 104 are approximately aligned with the bottom and top of the main housing 102. However, it is understood that this is only illustrative. For example, in other embodiments, the bottom 105A of the chimney 104 can be lower or higher than the main housing 102, e.g., to accommodate an energy source as described herein. Similarly, the top 105B of the chimney 104 can be lower or higher than the main housing 102, e.g., to accommodate placement of another structure, provide a longer structure for cooling, and/or the like.

The shaft 110 can extend through a hub 112, which can be approximately centrally located on the shaft 110. The shaft 110 can include a stopper or other structure which can affix and properly locate the hub 112 on the shaft 110. Alternatively, the shaft 110 can include two elongate structures, each of which is attached to the hub 112. The hub 112 can secure an end of a plurality of spokes 114 attached thereto at a desired orientation with respect to the hub 112 and shaft 110. For example, each spoke 114 can be oriented substantially perpendicular to the orientation of the shaft 110. The spokes 114 can be uniformly distributed about a perimeter of the hub 112 according to a number of spokes 114 utilized. For example, in the illustrated embodiment, the hub 112 can include eight spokes 114 extending therefrom, each of which is angled from the immediately adjacent spokes 114 by forty-five degrees.

The shaft 110, hub 112, and spokes 114 can be fabricated from lightweight, durable materials to minimize their overall mass and resistance to motion. For example, the shaft 110 and spokes 114 can be fabricated from small diameter carbon fiber rods. For example, both the shaft 110 and spokes 114 can have diameters that are less than 5 millimeters. In a more particular embodiment, the shaft 110 and/or spokes 114 can have diameters of approximately 1 millimeter. In an illustrative embodiment, the hub 112 can be fabricated from a carbon fiber composite or the like.

The base 106 can be configured to support the main housing 102 in a desired orientation. For example, as illustrated, the base 106 can be configured to support the main housing 102 in a substantially vertical orientation. Any suitable configuration for the base 106 can be utilized. In an embodiment, as shown, the base 106 can comprise an inverted half cylinder, with an open bottom and interior. The base 106 can include a centrally located opening 106A, which is configured to accommodate and support the main housing 102 in a substantially vertical orientation.

The main housing 102 can be permanently or temporarily attached to the base 106 using any of various solutions. For example, the base 106 and main housing 102 can include one or more fastening mechanisms, male/female connector, and/or the like, which locks the main housing 102 in place when it is placed at the correct angle with respect to the base 106. Furthermore, the main housing can be permanently secured to the base using an adhesive, and/or the like. The base 106 can be fabricated from any suitable material. In an embodiment, the material can be fused quartz, high silica glass, a ceramic, a carbon fiber composite, a nickel based alloy, and/or the like.

In an embodiment, the main housing 102 can be held in place on the base 106 when the shaft mounts 108A, 108B are mounted to the base 106 on opposing sides of the main housing 102. The shaft mounts 108A, 108B can be permanently or temporarily mounted to the base 106 using any suitable solution. As illustrated, each shaft mount 108A, 108B can include a bottom portion that has a complementary shape (e.g., semi-elliptical or semi-circular) to the shape of the top surface of the base 106. Each shaft mount 108A, 108B can be fabricated from any suitable material. In an embodiment, the material can be fused quartz, high silica glass, a ceramic, a carbon fiber composite, a nickel based alloy, and/or the like.

In an embodiment, an upper surface of the base 106 can include a male dovetail 130A, 130B for each shaft mount 108A, 108B, each of which can include a complementary female dovetail 132A, 132B for securing the shaft mount 108A, 108B to the base 106. The dovetail connection can include one or more features that secure the shaft mounts 108A, 108B in a desired position and orientation on the base 106. For example, the dovetail connection can include a stop, a gradually increasing diameter, and/or the like, which can be configured to secure each shaft mount 108A, 108B in a desired location and orientation with respect to the base 106 and main housing 102. In an embodiment, the main housing 102 and each shaft mount 108A, 108B can include one or more features, such as a fastening mechanism, male/female connector, and/or the like, which secures the shaft mount 108A, 108B to the main housing 102.

Each shaft mount 108A, 108B is configured to hold an opposing end of the shaft 110 at a desired location. In an embodiment, each shaft mount 108A, 108B utilizes a mounting solution which minimizes an amount of friction present when the shaft 110 rotates. For example, as illustrated, each shaft mount 108A, 108B can include a shaft support structure 134A, 134B which supports the shaft 110. Each shaft support structure 134A, 134B can be any suitable structure. For example, a shaft support structure 134A, 134B can comprise a bearing, such as a frictionless bearing, jewel bearing, and/or the like.

Figure 3A:
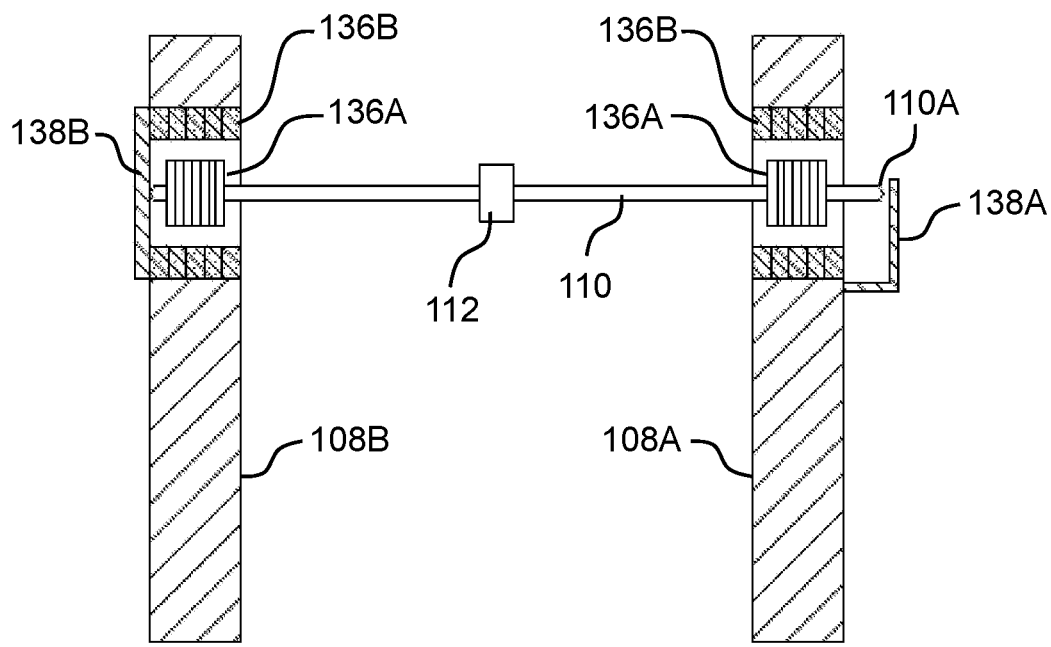
FIGS. 3A and 3B show an illustrative magnetic shaft support structure for supporting each end of the shaft according to an embodiment.
Figure 3B:
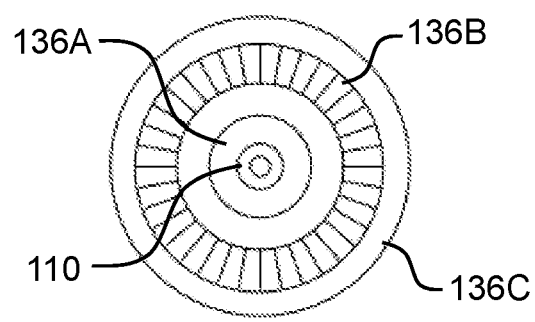

In an embodiment, a shaft support structure 134A, 134B can use an alternative to a bearing, such as a magnetic levitation system, in order to support the shaft 110 at a desired location while minimizing friction. To this extent, FIGS. 3A and 3B show an illustrative magnetic shaft support structure for supporting each end of the shaft 110 according to an embodiment. As illustrated, each end of the shaft 110 can have an inner radial magnet 136A mounted thereto using any solution, such as adhesive, a stopper, etc. The radial magnet 136A can be positioned such that it is centrally located within a corresponding outer permanent magnet ring 136B mounted to each shaft mount 108A, 108B using any solution. The polarizations, strengths, spacing, sizes, shapes, etc., of the respective magnets 136A, 136B can be configured such that the inner radial magnets 136A levitate in the spacing defined by the outer magnet rings 136B.

In embodiments, as illustrated in FIGS. 1A-2, a lateral location of the hub 112 must be maintained within a tight tolerance to prevent the spokes 114 from rubbing against a side of one or both of the channels 120C, 122C. Lateral movement of the shaft 110, and therefore the hub 112 and spokes 114, can be restricted using any of various approaches.

For example, as also shown in FIGS. 3A and 3B, a shaft mount, such as the shaft mount 108A, can include a shaft retainer 138A mounted thereto. The shaft retainer 138A can include a substantially vertical structure that extends to a height above the shaft 110 and is located at a predetermined extent to which an end 110A of the shaft 110 can laterally move while the hub 112 remains in a suitable position. During operation, the shaft end 110A can contact the shaft retainer 138A, which prevents the shaft 110 from moving any further laterally. To minimize friction, the shaft end 110A can be sharpened to a point to minimize the contact area between the shaft end 110A and the shaft retainer 138A.

Similarly, a shaft mount, such as the shaft mount 108B, can include an end plate 138B mounted thereto. The end plate 138B can provide a substantially vertical structure that prevents a corresponding end 110B of the shaft 110 from extending beyond an outer surface of the shaft mount 108B. To minimize friction, the shaft end 110B can be sharpened to a point to minimize the contact area between the shaft end 110B and the end plate 138B.

While use of both a shaft retainer 138A and end plate 138B is shown, it is understood that this configuration is only illustrative. In embodiments, both shaft mounts 108A, 108B can include shaft retainers or end plates. Additionally, alternative approaches to shaft retainers or end plates can be utilized to ensure that the hub 112 stays in a desired lateral location during rotation of the shaft 110. For example, when the magnetic levitation system shown in FIGS. 3A and 3B is utilized, one or both shaft mounts 108A, 108B can include a magnetic structure that exerts a lateral force on the inner radial magnet 136A. The lateral force can be configured to keep the shaft 110 and hub 112 in a desired position.

Referring again to FIGS. 1A-2, each spoke 114 can have a vane 116 attached thereto. In an embodiment, the vanes 116 are attached to the spokes 114 using a solution which allows each vane 116 to be readily exchanged for another vane 116. For example, each vane 116 can have a female connector that is configured to securely attach to an end of the spoke 114. The connector on the vane 116 and/or a shape of the spoke 114 can be configured to ensure that the vane 116 has a desired orientation. For example, the end of the spoke 114 and female connector of the vane 116 can be generally circular with a flat surface on one side. To attach the vane 116 to the spoke 114, the flat surfaces must align, thereby ensuring that the vane 116 has a desired orientation. However, it is understood that a connection mechanism can enable the vane 116 to be attached in any of various orientations, which also can be evaluated using the system described herein.

Each vane 116 can be fabricated using any suitable material. In an embodiment, a vane 116 is fabricated using a lightweight material, such as an aluminum alloy, muscovite mica, graphene, and/or the like. Similarly, each vane 116 can have any of various sizes, shapes, features, thicknesses, etc. Different vane 116 compositions and/or configurations can be used to evaluate their effectiveness with respect to other compositions and/or configurations. The vanes 116 used at any given time can all be the same or can include two or more different compositions and/or configurations. In an embodiment, a vane 116 can be composed of an aluminum alloy and configured to have a concave surface with a cone in the center pointing outward on one side and a convex surface on the opposing side. The vane 116 can be oriented such that the concave surface with the cone faces toward an energy source (e.g., downward), such as a laser, when the vane 116 enters the chimney 104.

The vanes 116 can have one or more features desirable for use in conjunction with a type of source of energy. For example, when the source of energy is electromagnetic radiation, the vanes 116 can be composed of any suitable material. In an embodiment, a vane 116 can be composed of muscovite mica, or the like, and can have a first side coated with a silver or white reflective material, while the other side is coated with an absorbing material, such as a black nanotube light absorbing material. In this case, the vane's black surface can face toward the source of energy as it enters the chimney 104. In an embodiment, a vane 116 can have a concave surface on one side and a convex surface on the opposing side. Such a vane 116 can be fabricated from a lightweight material, such as graphene. The vane 116 can be oriented such that the convex surface faces toward the source of energy when the vane 116 enters the chimney 104.

As discussed herein, an embodiment of the housing 100 can be used to evaluate various compositions and/or configurations of the vanes 116. To this extent, one or more components of the housing 100 can be configured to be readily and repeatedly assembled and disassembled. In an embodiment, the chimney 104 can be repeatedly secured and removed from the main housing 102. Removal of the chimney 104 can provide an individual with access to the vanes 116, e.g., to replace or reconfigure one or more of the vanes 116.

Figure 4A:
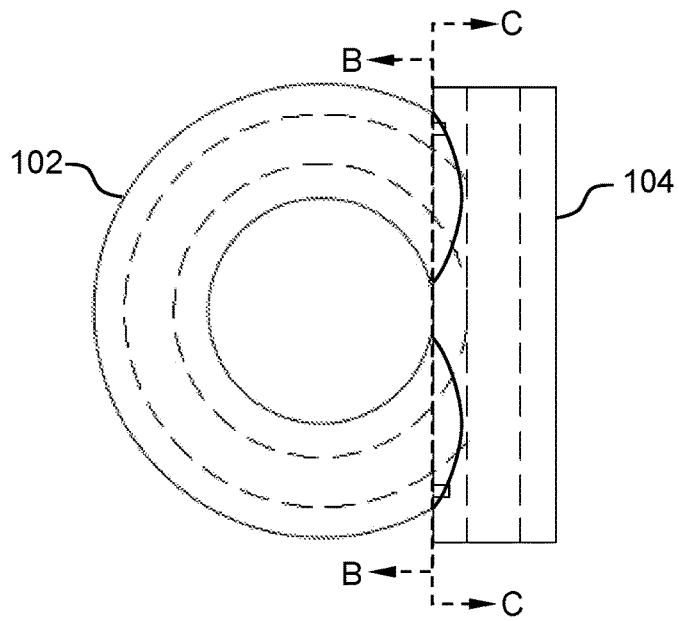
FIGS. 4A-4C show front and cutaway views of a connection between the main housing and chimney according to an embodiment.
Figure 4B:
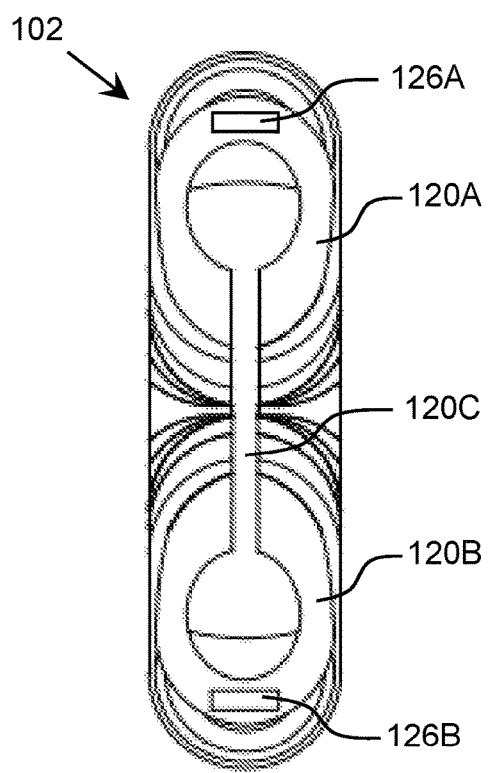
Figure 4C:
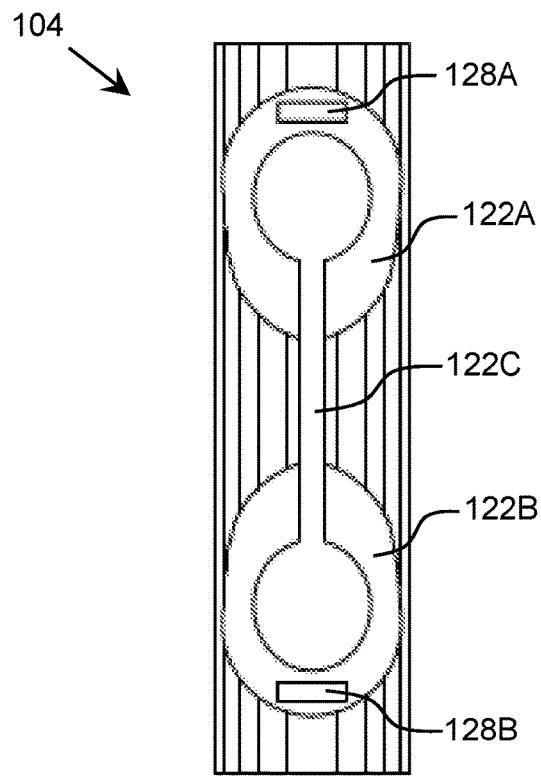

FIGS. 4A-4C show front and cutaway views of a connection between the main housing 102 and chimney 104 according to an embodiment. As previously discussed, the main housing 102 includes two ends 120A, 120B, each of which is configured to securely attached to a corresponding opening 122A, 122B on the chimney 104. Each structure includes an open channel 120C, 122C, which enables the unobstructed motion of the spokes 114 therethrough during operation of the system.

The ends 120A, 120B and openings 122A, 122B can include any type of structure for assembling the main housing 102 and chimney 104. For example, the main housing 102 is shown including a pair of protrusions 126A, 126B, each of which is shown located on an outer portion of the corresponding end 120A, 120B, respectively. Furthermore, the chimney 104 is shown including openings 128A, 128B which are located in complementary positions as the protrusions 126A, 126B. When properly aligned, the protrusions 126A, 126B of the main housing 102 can be securely inserted into the openings 128A, 128B of the chimney 104 to securely assemble the chimney 104 to the main housing 102, e.g., using a transition fit. The main housing 102 and chimney 104 can be manufactured such that, once properly assembled, the channels 120C, 122C and the open interiors of the main housing 102 and chimney 104 provide a smooth path for the unobstructed movement of the spokes 114 and vanes 116 therein.

As illustrated, the channels 120C, 122C can be significantly narrower than the corresponding openings which are sized to accommodate vanes having a predetermined maximum diameter. As a result, the chimney 104 has a barbell shaped opening, with two larger openings connected by a narrower opening that only needs to accommodate the spokes. Similarly, each end 120A, 120B of the main housing 102 included a larger elliptical opening with a narrower slot extending therefrom. When the main housing 102 has an open central area (e.g., has a torus shape), the narrower slot can extend around an interior of the main housing 102 defining the central area. Such a configuration can minimize an amount of the chimney 104 and main housing 102 removed for the movement of the spokes and vanes for a given size and tolerance. In an embodiment, each of the openings and channels 120C, 122C can be sized to accommodate a maximum spoke or vane diameter plus a particular tolerance. The tolerance can be selected based on how precisely the various parts can be machined and located in the desired location.

It is understood that the protrusions 126A, 126B and openings 128A, 128B and the locations thereof are only illustrative of any number of configurations that can be utilized to securely, but removably attach the chimney 104 to the main housing 102. To this extent, embodiments can include different numbers of protrusions, locations of protrusions, shapes of protrusions, etc. Similarly, the main housing 102 and the chimney 104 can include any number of zero or more protrusions and openings. In an embodiment, protrusions and openings that extend substantially all the way around the ends 120A, 120B and openings 122A, 122B can be utilized.

Figure 5:
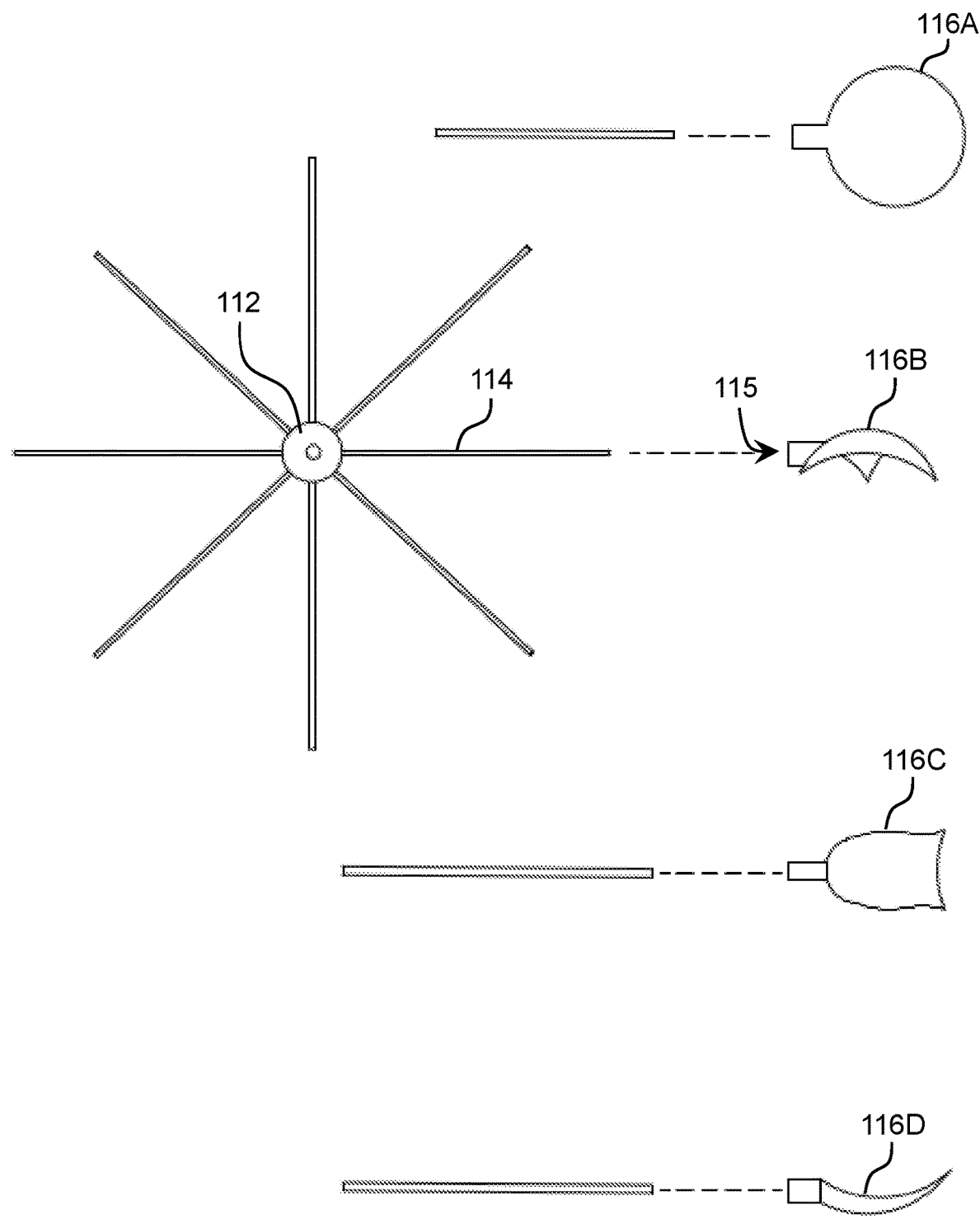
FIG. 5 shows a more detailed view of an illustrative hub and spokes and various possible vanes according to embodiments.

The vanes 116 also can be attached to each spoke 114 in a manner that allows for both a secure attachment as well as removal and replacement thereof. FIG. 5 shows a more detailed view of an illustrative hub 112 and spokes 114 and various possible vanes 116A-116D according to embodiments. As illustrated, a spoke 114 can have a diameter that is sized to be securely inserted into an opening 115 of a vane 116A-116D, e.g., using a transition fit. The diameter and depth of the opening 115 can be sized to securely attach the vane 116A-116D to the spoke 114. Similarly, each spoke 114 can be inserted into the hub 112 using a similarly sized opening in the hub 112. As discussed herein, a shape of the spoke 114 and/or opening 115 can be configured to ensure that the vane 116A-116D is oriented in a suitable direction when secured to the spoke 114. Alternatively, the connection can enable rotation of the vane 116A-116D, which can facilitate experimentation with different vane orientations. Regardless, the spoke 114 and vane 116A-116D can be sized to ensure that the vane 116A-116D can move in an unobstructed manner through the circular path defined by the main housing 102 and the chimney 104.

It is understood that the illustrated vanes 116A-116D are only illustrative of various possible shapes and configurations of vanes 116A-116D which can be utilized and evaluated in conjunction with the system described herein. To this extent, the illustrated sizes, shapes, and configurations are not inclusive of all possible sizes, shapes, and configurations. In general, the only limiting factors for a vane 116A-116D are its ability to be secured to a spoke 114 and ability to move in an unobstructed manner within the path defined by the main housing 102 and chimney 104 (e.g., fit within a shape defined by the narrowest portion of the path).

Figure 6:
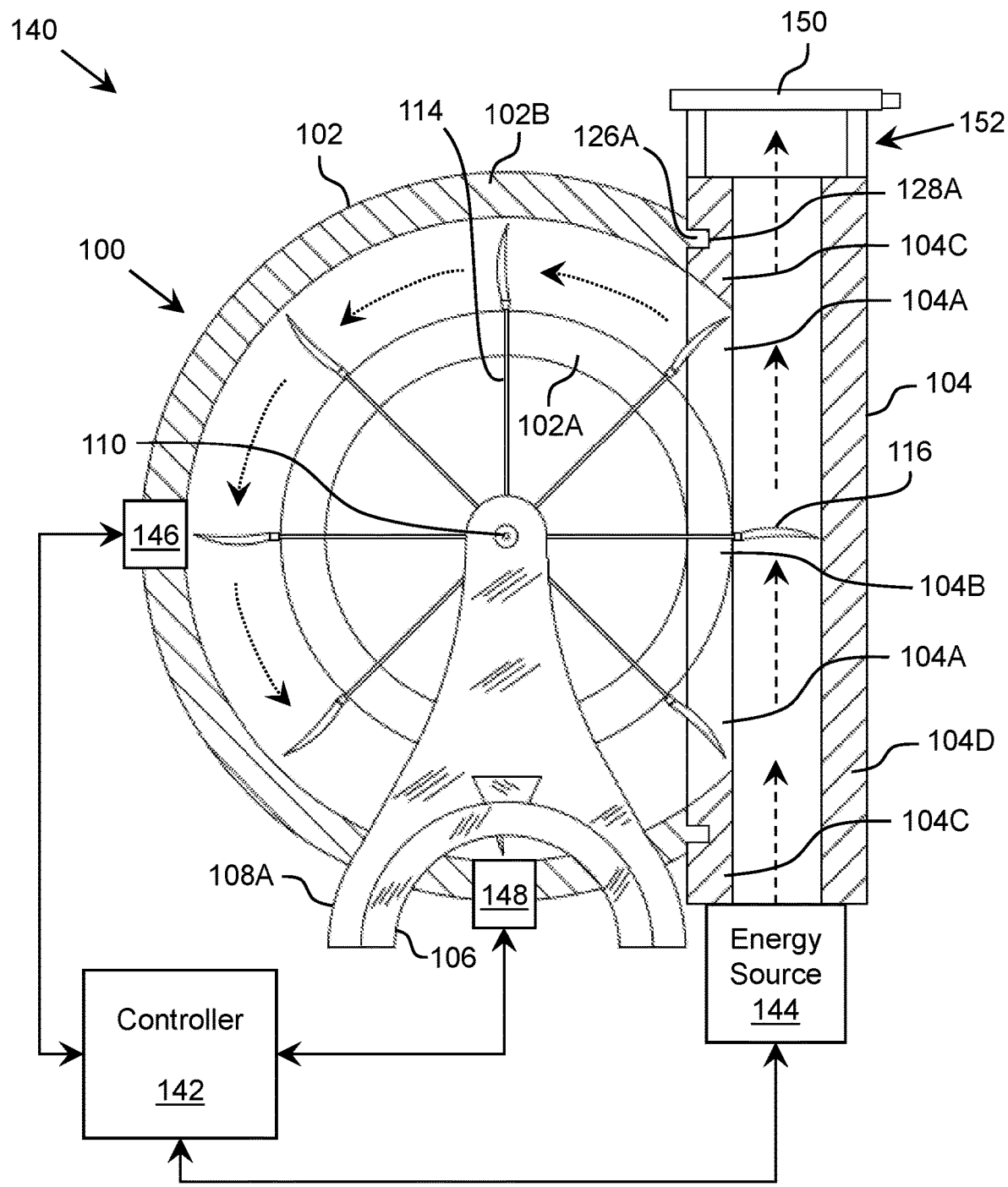
FIG. 6 shows a partial cutaway front view of an illustrative turbine system including the turbine housing according to an embodiment.

As discussed herein, the turbine housing 100 can be utilized as part of a turbine system configured to, for example, evaluate various vanes 116A-116D. To this extent, FIG. 6 shows a partial cutaway front view of an illustrative turbine system 140 including the turbine housing 100 according to an embodiment. In this illustration, the main housing 102 and the chimney 104 have been cutaway along a line defined by the path of rotation for the shafts 114.

To this extent, as illustrated, the main housing 102 includes an inner surface 102A which defines a first side of the channel 120C for rotation of the spokes 114 and an inner extent of the path traversed by the vanes 116. The main housing 102 also includes an outer cutaway surface 102б which defines an outer extent of the path traversed by the vanes 116. Similarly, the chimney is shown including facing surfaces 104A, which define an extent of each opening 122A, 122B, and a facing surface 104B, which defines an extent of the channel 122C for the spokes 114. As illustrated, the facing surface 104б can have an inner facing side that is arc shaped, defining an inner extent of the path traversed by the vanes 116.

Additionally, the chimney 104 includes outer cutaway surfaces 104C, each of which extends above or below the path of the vanes 116 and defines a first side of the interior of the chimney 104 above and below the path of the vanes 116. As illustrated, each outer cutaway surface 104C can include an opening, such as the opening 128A, into which a protrusion, such as the protrusion 126A, extending from an end of the outer cutaway surface 102б of the main housing 102 can be inserted to secure the main housing 102 to the chimney 104, e.g., using a transition fit. The chimney 104 further includes an outer cutaway surface 104D defining a far end of an interior of the chimney 104.

The openings 122A, 122B and channel 122C can be sized to enable vanes 116 to be replaced while the chimney 104 is detached from the main housing 102, and enable the chimney 104 and main housing 102 to be reattached with the vanes 116 secured to an end of each spoke 114. In the embodiment illustrated, when reattaching the chimney 104 to the main housing 102, a vane 116 extending from the main housing 102 can be inserted into the chimney 104 through an opening 122A, 122B and the spoke 114 can be moved along the channel 122C as the respective openings of the main housing 102 and chimney are aligned and attached.

Depending on the number of spokes 114, tolerances, for ease of use, etc., an opening 122A, 122B can have an elongated shape from that illustrated to enable a properly oriented vane 116 to more readily be inserted into the chimney 104 during assembly of the main housing 102 and chimney 104. For example, a facing surface 104A may extend further toward the middle, thereby shortening a length of the facing surface 104B and the channel 122C. In embodiments, the main housing 102 can include structure corresponding to the facing surface 104б, which forms adjacent sides of the channel 122C and is complementary to an opening in the chimney 104 when the chimney 104 is attached to the main housing 102. In this case, the chimney 104 can include, for example, a rounded rectangular opening, which can be defined by the extents of the openings 122A, 122B and the distance there between and the facing surface 104б can be part of a complementary structure of the housing 102 that narrows the rectangular opening and forms the channel 122C.

The turbine system 140 is shown including a controller 142, which can be configured to operate an energy source 144 to emit energy, such as electromagnetic radiation, which is directed into the chimney 104. The emitted energy impacts a vane 116 located within the chimney 104, causing the vane 116 to move upward. One or more sensors 146, which can be mounted on the main housing 102, can acquire data regarding the movement of the vanes 116. Each sensor 146 can provide data regarding the movement of the vanes to the controller 142, which can process and/or store the data for analysis. Furthermore, the controller 142 can be configured to operate one or more environmental devices 148, which can affect one or more attributes of the environment within the main housing 102 and chimney 104.

The controller 142 can include one or more of any of various types of computing units. For example, the controller 142 can comprise a general purpose computing unit including one or more processors for executing program code in order to control the turbine system 140 to implement a method of evaluating motion of the vanes 116 induced by an energy source 144. Execution of the program code can cause the controller 142 to perform various actions described herein. However, it is understood that this is only illustrative, and the controller 142 can be physically implemented by any of various combinations of circuits, discrete components, microprocessors, hard-wired circuits, memory components, wiring, and/or the like, which may be formed using known manufacturing technologies. In an embodiment, the controller 142 can be configured to acquire evaluation data from the sensor(s) 146 which can be pre-processed and/or stored for subsequent evaluation by another system and/or a user.

The turbine system 140 can include any number of one or more sensors 146, each of which can be mounted at any suitable location on the main housing 102, chimney 104, and/or the like, and each of which can acquire evaluation data for use in evaluating a configuration of vanes 116 and energy source 144.

In an embodiment, the turbine system 140 includes at least one sensor 146 for acquiring data corresponding to movement of the vanes 116 in response to the source of energy delivered by the energy source 144. Such a sensor 146 can acquire data that directly or indirectly corresponds to the movement of the vanes 116. For example, the sensor 46 can measure one or more attributes of movement of the shaft 110, spokes 114, and/or vanes 116, and determine a velocity of the movement of the vanes 116 at a given time based on the measured attribute(s). For example, the sensor 146 can acquire data regarding an amount of time between spokes 114 passing a given location with a known spacing between adjacent spokes 114. The time and known geometry of the spokes 114 and vanes 116 can be used to determine a velocity of the vanes 116. To this extent, a sensor 146 described herein can include a source and one or more sensing devices operating in conjunction with the source, such as a light beam and light sensor.

Additionally, the turbine system 140 can include one or more sensors for sensing a level of the source of energy provided by the energy source 144. For example, a sensor 146 can be mounted on an interior portion of the chimney 104. In an embodiment, a sensor 150 can be mounted above the chimney 104, e.g., on a support structure 152, which can provide an open area between the sensor 150 and a top of the chimney 104 to vent convection currents, allow heat to dissipate therefrom, etc. The sensor 150 can comprise any suitable sensing device 150 based on the type of energy source 144 used. In an embodiment, when the energy source 144 comprises an electromagnetic radiation source, the sensing device 150 can comprise a solar cell, which can generate electricity in response to the electromagnetic radiation generated by the energy source 144. In this case, the electricity generated by the sensing device 150 can be utilized to power the controller 142 and/or one or more other sensors 146, and an amount of electricity generated by the sensing device 150 can be correlated to a level of the source of energy provided by the energy source 144, which can be processed by the controller 142 as evaluation data. Furthermore, the sensing device 150 can be sized and located to prevent extraneous sources of energy, such as light, from entering the chimney 104 from above, as well as shield against exposure to the energy, such as electromagnetic radiation, exiting the chimney.

In an embodiment, the turbine system 140 can include one or more components for capturing and storing energy generated by the rotation of the vanes 116. For example, the turbine system 140 can include a flywheel, which can be configured to store kinetic energy from the rotation of the vanes 116 and/or maintain inertia.

In embodiments, the controller 142 may or may not be able to control a level of the source of energy provided by the energy source 144. For example, the energy source 144 may be controlled by a user or another control unit separately from the controller 142. Additionally, embodiments of the energy source 144 can be passive sources of energy, not directly controlled by a user or a control unit. For example, the source of energy can comprise sunlight or another ambient light source. In this case, the energy source 144 can comprise an assembly configured to focus and/or redirect the light into the chimney 104. Such an assembly can include a reflective surface, such as a parabolic mirror, one or more lenses (e.g., Fresnel, magnifying, etc.), and/or the like. The assembly can be adjusted by the controller 142, manually, or using another control unit based on a location of the light source and/or the movement thereof in order to direct the light into the chimney 104.

In embodiments, the turbine system 140 also can include one or more environmental devices 148, which can affect one or more attributes of the interior of the main housing 102 and/or the chimney 104. To this extent, an environmental device 148 can be mounted to any suitable location of the main housing 102 or chimney 104, based on its functionality. For example, an environmental device 148 can comprise a source of air, which the controller 142 can operate to initiate motion of the vanes 116. In particular, a short burst of a small amount of air can be used to overcome the inertia of starting movement of the vanes 116 from a stationary position. In an embodiment, the force exerted by the environmental device 148 can be measured and used in calculating movement of the vanes 116 due to the source of energy provided by the energy source 144.

The turbine system 140 can include other types of environmental devices 148 and/or sensors 146, which can affect and/or acquire data corresponding to any of various attributes of the turbine system 140, such as within the main housing 102 or the chimney 104, and/or the ambient environment of the turbine system 140. For example, illustrative sensors 146 include a light sensor, a temperature sensor, a humidity sensor, a pressure sensor, an anemometer, a wind vane, a gas sensor, etc. Illustrative environmental devices 148 include a heating and/or cooling unit, a pressurization (depressurization) system (e.g., a vacuum pump), a humidifier or dehumidifier, a light source, a wind source, a gas source, etc.

An environmental device 148 can be selectively operated, e.g., by the controller 142 and/or manually. For example, a particular configuration of an electromagnetic radiation source and vanes can be evaluated in ambient pressure, as well as when the pressure within the turbine housing and chimney is reduced (e.g., to create a partial vacuum) or increased. Similarly, selective operation of a heating and/or cooling unit, a gas source, etc., can enable evaluation of how temperature, atmospheric composition, etc., can affect movement induced by a particular configuration of an electromagnetic radiation source and vanes.

When environmental device(s) 148 are utilized, it is understood that the main housing 102 and chimney 104 can be configured to facilitate such use. For example, the main housing 102 and chimney 104 can form an enclosed environment within which one or more aspects of the atmosphere, including pressure, composition, humidity, temperature, etc., can be selectively adjusted. In such an embodiment, the chimney 104 can have a longer length than that illustrated so that any convection, heat, etc., which may accumulate at a top thereof, can have a reduced affect on the area within which the vanes 116 are moving. Furthermore, one or more environmental devices 148 can be located at or near the top of the chimney 104, which the controller 142 can operate to further reduce any effects due to convection, heat, etc.

In another embodiment, the turbine system 140 can be located in a larger environment within which one or more aspects of the atmosphere are selectively adjusted and/or differ from other atmospheric conditions in which the turbine system 140 has also been utilized. For example, the turbine system 140 can be located within a larger enclosure for which one or more atmospheric conditions are selectively adjusted, e.g., by the controller 142 operating one or more environmental devices 148 configured to adjust the corresponding atmospheric condition(s) within the enclosure, by a separate system, and/or the like. Similarly, the turbine system 140 can be located for use in an ambient environment that differs from another ambient environment, such as within an air conditioned room, outdoors, at differing elevations, in outer space, etc. In each case, the controller 142 can receive data corresponding to one or more atmospheric conditions from one or more sensors 146.

The energy source 144 can comprise any type of energy source to be evaluated using the turbine system 140. In an embodiment, the energy source 144 is an electromagnetic radiation (e.g., visible light) source, such as a laser or other concentrated light source. Such an electromagnetic radiation source can be configured to generate any of various possible power outputs, intensities, frequencies, wavelengths, etc. The controller 142 can operate the energy source 144 in any manner, such as by pulsing an output, continuous output, an initial high energy pulse followed by a transition to a continuous output beam, etc. The controller 142 can adjust operation of the energy source 144 based on a movement and/or location of the vanes 116. For example, the controller 142 can operate the energy source 144 to transition to a lower output after movement of the vanes 116 has increased to a predetermined velocity. Additionally, the controller 142 can pulse the energy source 144 to impact a vane 116 only when it is present in the chimney at a particular location or within a particular region.

When the energy source 144 is an electromagnetic radiation source, the chimney 104 can be oriented vertically with the energy source 144 located at the bottom to vent convection currents and allow heat to dissipate from the top of the chimney 104. However, it is understood that for other energy sources, the chimney 104 can be configured to be oriented differently, such as laterally, and/or the energy source 144 can be placed in a different location, such as at a top of the chimney 104. Other such energy sources 144 can comprise a wind source, a liquid (e.g., water) source, a steam source, a heat source, etc.

As discussed herein, the turbine system 140 can be used to implement a method for evaluating any of various compositions and/or configurations of vanes 116 used in conjunction with any type of energy source. As part of the evaluation, the chimney 104 can be removed from the main housing 102, e.g., by pulling the pieces apart. When disconnected, an individual can rotate and selectively remove/replace the vanes 116 until all of the vanes 116 have the desired composition and/or configuration and are facing in a desired orientation for evaluation. Subsequently, the chimney 104 can be reattached to the main housing 102. The energy source 144 can be located in a suitable location and the controller 142 can commence acquiring evaluation data for the vanes 116 as described herein. For example, the controller 142 can adjust one or more aspects of the environment within the housing 102 and the chimney 104, operate the energy source 144, and receive, process, and store evaluation data corresponding to the environment and vane 116 movement therein. The controller 142 can continue to acquire evaluation data for a predetermined amount of time, until instructed to stop by a user, and/or the like. The controller 142 can present the evaluation data for presentation to a user, generate and/or present comparison data for multiple evaluations performed using different vanes 116 and/or energy sources 144, etc.

Embodiments of the turbine housing 100 described herein can be manufactured to any of various sizes and scales. A particular size of an embodiment of the turbine housing 100 can be selected based on an amount of energy generated by the energy source 144 to be utilized in conjunction therewith.

As used herein, unless otherwise noted, the term "set" means one or more (i.e., at least one) and the phrase "any solution" means any now known or later developed solution. The singular forms "a," "an," and "the" include the plural forms as well, unless the context clearly indicates otherwise. Additionally, the terms "comprises," "includes," "has," and related forms of each, when used in this specification, specify the presence of stated features, but do not preclude the presence or addition of one or more other features and/or groups thereof.

It is understood that, unless otherwise specified, each value is approximate and each range of values included herein is inclusive of the end values defining the range. As used herein, unless otherwise noted, terms of degree such as "generally", "substantially", "about", and "approximately" mean a reasonable amount of deviation of the modified term such that the end result is not significantly changed. For example, the term "approximately" can be inclusive of values within +/−ten percent of the modified term, while the term "substantially" can be inclusive of values within +/−five percent of the modified term, if such deviation would not negate the meaning of the modified term. Unless otherwise stated, two values are "similar" when the smaller value is within +/−twenty-five percent of the larger value.

As also used herein, a structure is "transparent" when the structure allows at least ten percent of radiation having a target wavelength, which is radiated at a normal incidence to a surface of the structure, to pass there through. Furthermore, as used herein, a structure is "reflective" when the structure reflects at least ten percent of radiation having a target wavelength, which is radiated at a normal incidence to a surface of the structure. In an embodiment, the target wavelength of the radiation corresponds to a wavelength of radiation emitted (e.g., peak wavelength +/−five nanometers) by an energy source during operation of the system.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A light turbine comprising:
   a turbine housing including:
   a main housing;
   a chimney, removably attached to the main housing, wherein the main housing and chimney define a circular path within which vanes can move;

a shaft extending through the main housing; and a hub configured to secure a plurality of spokes, wherein each spoke extends radially from the hub and removably supports a corresponding vane located within the circular path; and an electromagnetic radiation source configured to direct electromagnetic radiation into the chimney for causing the vanes to move in and through the chimney thereby causing rotation of the shaft.

2. The light turbine of claim 1, further comprising:

at least one sensing device configured to acquire movement data corresponding to movement of the vanes and/or rotation of the shaft; and a computing unit configured to receive and process the movement data.

3. The light turbine of claim 1, further comprising an environmental device configured to selectively adjust pressure within the main housing and the chimney.

4. The light turbine of claim 3, wherein movement of the vanes and/or rotation of the shaft can be evaluated in each of a plurality of different pressures.

5. The light turbine of claim 1, wherein the main housing and chimney are secured using a transition fit between a set of protrusions and a corresponding set of openings.

6. The light turbine of claim 1, wherein a vane is removably connected to a spoke using a transition fit.

7. A turbine comprising:

a turbine housing including:

a main housing; and a chimney, removably attached to the main housing using a transition fit between a set of openings and protrusions, wherein the main housing and chimney define a circular path within which vanes can move; and an energy source configured to direct a source of energy into the chimney for causing the vanes to move in and through the chimney, wherein the energy source is an electromagnetic radiation source, and wherein the chimney is oriented substantially vertically and an interior surface of the chimney is reflective.

8. The turbine of claim 7, wherein the turbine housing further includes:

a base configured to secure the main housing in a substantially vertical orientation;

a pair of shaft mounts located on opposing sides of the main housing;

a shaft extending through the main housing, each shaft mount configured to secure an end of the shaft;

a hub configured to secure a plurality of spokes, wherein each spoke extends radially from the hub and removably supports a corresponding vane located within the circular path.

9. The turbine of claim 8, wherein the source of energy causes rotation of the shaft by causing the vanes to move.

10. The turbine of claim 7, wherein the energy source is at least one of: sunlight, a laser, or another concentrated light source.

11. The turbine of claim 7, further comprising:

at least one sensing device configured to acquire movement data corresponding to movement of the vanes; and a computing unit configured to receive and process the movement data.

12. The turbine of claim 11, further comprising at least one sensing device configured to acquire energy source data corresponding to an intensity of the source of energy in the chimney, wherein the computing unit is further configured to receive and process the energy source data.

13. A turbine housing comprising:

a main housing; and a chimney, removably attached to the main housing, wherein the main housing and chimney define a circular path within which vanes can move, wherein the chimney is oriented substantially vertically when attached to the main housing and an interior surface of the chimney is reflective.

14. The turbine housing of claim 13, wherein the main housing and chimney are secured using a transition fit between a set of protrusions and a corresponding set of openings.

15. The turbine housing of claim 13, wherein the chimney includes a tubular interior with a pair of openings and a narrower channel extending there between.

16. The turbine housing of claim 13, wherein the main housing comprises a tube forming a circular arc and including a narrow channel along an inner diameter of the circular arc.

17. The turbine housing of claim 13, further comprising:

a base configured to secure the main housing in a substantially vertical orientation;

a pair of shaft mounts located on opposing sides of the main housing; and a shaft extending through the main housing, each shaft mount configured to secure an end of the shaft.

18. The turbine housing of claim 17, further comprising a hub configured to secure a plurality of spokes, wherein each spoke extends radially from the hub and removably supports a corresponding vane located within the circular path.

19. The turbine housing of claim 13, further comprising at least one sensing device configured to acquire movement data corresponding to movement of the vanes.

20. The turbine housing of claim 13, wherein the main housing and the chimney form an enclosed environment.

* * * * *